United States Patent Office 3,058,866
Patented Oct. 16, 1962

3,058,866
METHOD OF PRODUCING A LIGHT-DIFFUSING LAYER ON GLASS SURFACES, ESPECIALLY ON THE INSIDE OF ELECTRIC LAMP ENVELOPES
Gunnar Georg Johan Günther, Stockholm, and Gösta Birger Rosengren, Alvsjo, Sweden, assignors to Lumalampan Aktiebolag, Stockholm, Sweden, a corporation of Sweden
No Drawing. Filed July 8, 1959, Ser. No. 825,677
Claims priority, application Sweden Aug. 27, 1958
8 Claims. (Cl. 156—25)

The present invention relates to a method for producing light-diffusing coatings on glass surfaces, especially on the inside of glass vessels used as envelopes for the filaments of electric lamps.

More precisely, the invention relates to a method of providing envelopes or bulbs for electric lamps with an inside, light-diffusing structure, consisting of an etched surface layer in the inner wall of the envelope and a light-diffusing, fine-grained particle layer carried by this etched layer.

Characteristic of the method implied is that it comprises a first stage of etching by hydrofluoric acid, and a second stage, immediately subsequent, of depositing the light-diffusing particle layer on the etched layer, the interior of the envelope being kept heated throughout the two stages.

In most cases the invention can also be practised in such a way as to carry out the etching and the powder deposit effects simultaneously and in conjunction.

The invention particularly aims at building up the light-diffusing particle layer in a very hot, oxygenous, aqueous vapour atmosphere, into which gaseous hydrofluoric acid is continuously fed—preferably directly or, alternatively, indirectly—by a suitable fluoric chemical compound in said atmosphere being brought to decompose, forming free hydrofluoric acid. In this way the etching effect on the glass surface is obtained instantly and at the same time, or approximately so, as the formation of the particle layer. There is nothing to prevent the coating method from being carried through step by step according to the invention, say, by the use of a series of burner heads, expediently arranged on an automatic machine, providing facilities for optional adjustment with great precision of the etching effect in relation to the quantity deposited of the light-diffusing particles. According to the invention the glass surface is locally heated very quickly and sufficiently from the inside by the heat development from a flame, but the heating can be accelerated by starting with preheated lamp envelopes.

It has been found important for the mechanical strength of the lamp that the lamp wall should not be allowed to cool down during or between the stages for the formation of the two layers.

Another aspect of the invention is that all development of layers containing hydrates is avoided, which layers would be quite disastrous for the life of the lamp.

A far better adherence is thus attained than in the case of an unetched glass-surface base, and if the light-diffusing particles consist of silicon dioxide, especially in the amorphous state, an ultrafine all-round superficial etching even of the individual $SiO_2$ particles will result, according to the invention, and the self-adhering effect becomes still more marked. By application of this etching method to the various surfaces also the light-diffusing property is increased.

An advantage of economic importance in utilizing the present invention is that the manufacturer can start with bulbs of clear glass, which are cheaper than frosted bulbs, and accomplish a surface etching of controllable extension and depth action simultaneously with the powder coating. In sealing the stem of a lamp to the lamp bulb it is more favourable if the neck itself is unetched and clear, being then more easily checked and kept free from particles that make a perfect and durable glass sealing difficult. This detail is another important characteristic of the invention.

The high temperature of the reaction atmosphere may conveniently be generated by the flame of a burner placed in the sphere of the glass envelope and fed with, for instance, pure hydrogen and pure oxygen (oxyhydrogen gas), gasified ethyl alcohol or other suitable, combustible, gasified liquids of high combustion heat. The device specified by us in Patent No. 2,693,783 can be employed to advantage, the combustible gas or the liquid that is to be gasified being led in through a central tube and the oxygen gas through a tube surrounding the former. According to the invention, the light-diffusing particles may either be blown from the outside into the volume of the glass envelope or be generated chiefly therein by burning a suitable material, for instance elementary silicon in powder form, easily combustible metal powders, or other compounds that burn into chiefly pure oxides, also such with organic radicals, for instance ethyl orthosilicate. Most appropriately in conformity with the inventor's idea the powder particles can be generated by the high-thermic hydrolysis method specified in our co-pending patent application No. 694,954, now Patent 2,982,668, as by passing the particle-generating compound through a hot oxygen-hydrogen flame at temperatures over above about 2000° C. so that the oxide particles generated are of a size less than about one micron. As noted above, the hydrofluoric acid concentration may vary over wide ranges depending upon the degree of etching desired, as well understood in this art.

According to one application of the preparation method, by burning pure hydrogen in oxygen in an oxyhydrogen flame a hot aqueous vapour atmosphere is thus generated inside the glass envelope that is to be coated with a light-diffusing layer. The gasified particle-generating compound, e.g. titanium tetrachloride and/or silicon tetrachloride, is injected into the hydrogen stream for the purpose of a high-thermic hydrolysis, while gaseous hydrofluoric acid is injected into the oxygen stream. At the high temperature of the oxyhydrogen flame and under the humidity conditions the hydrofluoric acid instantly etches the glass surface and the generated rounded amorphous $SiO_2$-particles as well, which deposit on said glass surface base, providing the advantages mentioned above.

What we claim is:

1. In a method of providing a light-diffusing surface on the inside of glass bulbs for electric lamps, which surface comprises an etched area on the inside of said glass bulb having deposited and adhered thereon finely divided light diffusing particles selected from the group consisting of oxides of titanium and silicon, the steps which comprise etching said inside surface of said glass bulb with hot gaseous hydrogen fluoride, depositing on said etched surface hot finely divided particles of said light-diffusing material, and maintaining at least said inside surface of said glass bulb heated to an elevated temperature throughout said etching and depositing steps.

2. In a method of providing a light-diffusing surface on the inside of glass bulbs for electric lamps, which surface comprises an eched area on the inside of said glass bulb having deposited and adhered thereon finely divided light-diffusing particles selected from the group consisting of oxides of titanium and silicon, the steps which comprise heating the inside surface of said glass bulb with a hot gas stream, etching said inside surface of said glass bulb with hot gaseous hydrogen fluoride admixed with said hot gas stream, and depositing on said etched surface said finely divided light-diffusing particles for adherence thereto and also admixed in said hot gas stream.

3. A method as recited in claim 1 in which said hydrogen fluoride and said finely divided light-diffusing particles are introduced substantially simultaneously into said bulb for etching of both said particles and said inside surface of said bulb by said hydrogen fluoride.

4. A method as recited in claim 1 in which said hydrogen fluoride is formed within said bulb by decomposition of a fluorine compound.

5. A method as recited in claim 1 in which said oxide is formed within said bulb by oxidation therein.

6. A method as recited in claim 1 in which said oxide is formed within said bulb by high temperature hydrolysis of a salt of said metal.

7. In a method of providing a light-diffusing surface on the inside of glass bulbs for electric lamps, which surface comprises an etched area on the inside of said glass bulb having diffused and adhered thereon finely divided light-diffusing particles of titanium dioxide, the steps which comprise etching said inside surface of said glass bulb with hot gaseous hydrogen fluoride, depositing on said etched surface hot finely divided particles of said titanium dioxide, and maintaining at least said inside surface of said glass bulb heated to an elevated temperature throughout said etching and depositing steps.

8. A method as recited in claim 7 in which said titanium dioxide particles are formed within said glass bulb by high temperature hydrolysis of titanium tetrachloride injected thereinto concurrently with said hot gaseous hydrogen fluoride.

References Cited in the file of this patent

UNITED STATES PATENTS

| | | |
|---|---|---|
| 1,875,819 | Naruse | Sept. 6, 1932 |
| 1,997,375 | Naruse | Apr. 9, 1935 |
| 2,110,117 | Duldner et al. | Mar. 1, 1938 |
| 2,297,981 | Pipkin | Oct. 6, 1942 |
| 2,982,668 | Gunther et al. | May 2, 1961 |